(12) United States Patent
Henderson et al.

(10) Patent No.: US 6,964,334 B2
(45) Date of Patent: Nov. 15, 2005

(54) SLIDER BLOCK FOR PUSHER LUG

(75) Inventors: Deane Henderson, Salmon Arm (CA); Geoff Wight, Salmon Arm (CA); Jason Willey, Salmon Arm (CA)

(73) Assignee: COE Newnes/McGehee, ULC, Salmon Arm (CA)

( * ) Notice: Subject to any disclaimer, the term of this patent is extended or adjusted under 35 U.S.C. 154(b) by 140 days.

(21) Appl. No.: 10/752,585

(22) Filed: Jan. 8, 2004

(65) Prior Publication Data
US 2005/0150746 A1 Jul. 14, 2005

(51) Int. Cl.[7] ............................................. B65G 15/60
(52) U.S. Cl. ..................................................... 198/841
(58) Field of Search ........................................ 198/841

(56) References Cited
U.S. PATENT DOCUMENTS

| | | | |
|---|---|---|---|
| 3,858,713 A | 1/1975 | Allen | |
| 3,955,666 A | 5/1976 | Braun et al. | |
| 4,159,056 A | 6/1979 | Pirman et al. | |
| 4,441,605 A | * | 4/1984 | Ronco et al. ................ 198/731 |
| 4,886,156 A | 12/1989 | Records et al. | |
| 5,165,523 A | 11/1992 | Wooley et al. | |

* cited by examiner

Primary Examiner—Joe Dillon, Jr.
(74) Attorney, Agent, or Firm—Antony C. Edwards

(57) ABSTRACT

An improved slider block is a length of flanged channel having a cut-out in the lower web of the channel to accommodate mounting a flat bar journalled in the cut-out. The flanged channel is resilient. The flanged channel has a length sufficient to cover the length of a base plate on which the flat bar is orthogonally mounted. The sides of the channel define a cavity having a depth corresponding to the thickness of the base plate. A pair of flanges extend inwardly over the cavity from the sides of the channel so as to define a chain-receiving slot therebetween. The base plate mounts within the cavity. The base plate is welded to a chain so that when the base plate is mounted in the cavity the chain is mounted in and along the chain-receiving slot.

4 Claims, 3 Drawing Sheets

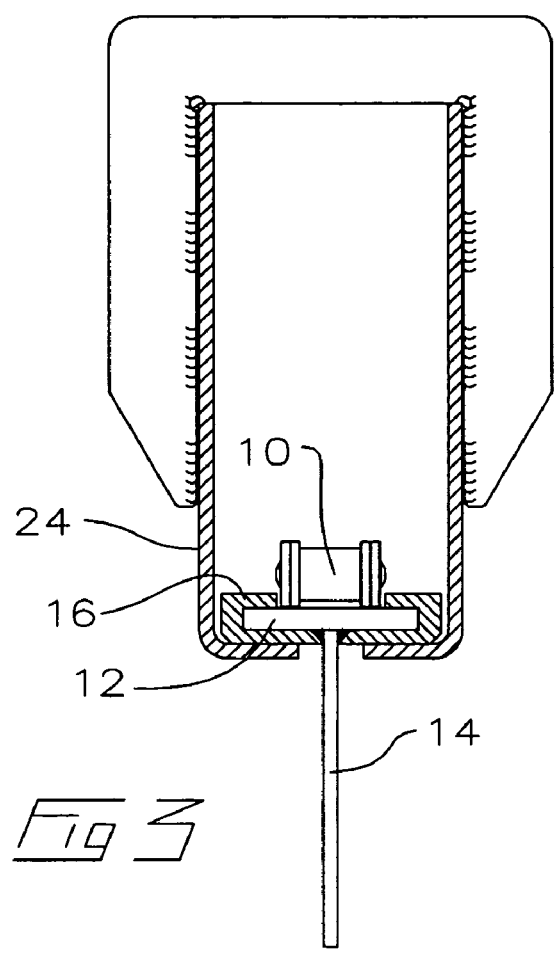
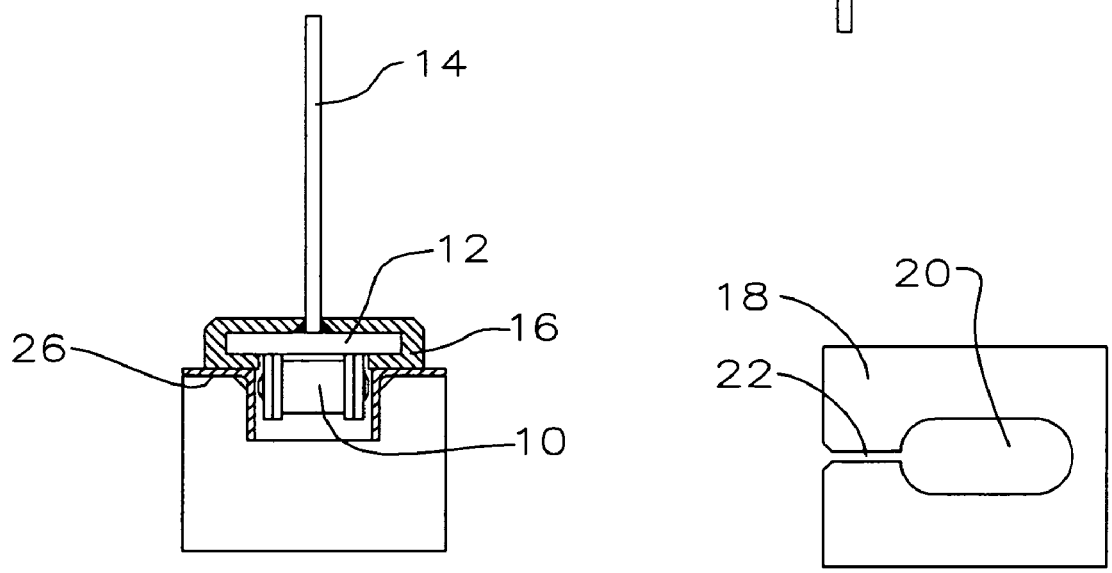

SLIDER BLOCK FOR PUSHER LUG

FIELD OF THE INVENTION

This invention relates to the field of pusher lug lumber conveyors employed in the lumber industry, and in particular to an improvement to pusher lug slider blocks.

BACKGROUND OF THE INVENTION

It is common practice in lumber processing facilities such as sawmills to transport lumber over the top of sorter bins by overhead chain conveyors equipped with pusher lugs. Chain conveyors for the movement of lumber have links which each have an upstanding lug mounted thereon, spaced at intervals along the chain. Movement of the chain brings the lug into contact with the lumber, which is then urged in the direction of the running of the chain. When the lumber is located over a desired bin, a gate corresponding to that bin opens allowing the lumber to fall into that bin. Conventionally, a slider block is rigidly mounted to the chain where the pusher lugs attach to the chain to facilitate sliding translation of the lugs along the conveyor. Typically, fasteners attach the slider block to the chain, requiring that the chain links be pre-drilled where the slider blocks are to be fastened. Thus, the process of attaching the slider blocks to the chain is time consuming and costly.

It is consequently an object of the present invention to provide a slider block that requires no pre-drilling of the chain and no fasteners for mounting of the slider block onto the chain and pusher lug. It is a further object of the present invention to provide for the efficient installation and replacement of slider blocks.

SUMMARY OF THE INVENTION

In summary, the improved slider block of the present invention is a length of flanged channel having a cut-out in the lower web of the channel to accommodate mounting a flat bar journalled in the cut-out. The flanged channel is resilient. The flanged channel has a length sufficient to cover the length of a base plate on which the flat bar is orthogonally mounted. The sides of the channel define a cavity having a depth corresponding to the thickness of the base plate. A pair of flanges extend inwardly over the cavity from the sides of the channel so as to define a chain-receiving slot therebetween. The base plate mounts within the cavity. The base plate is welded to a chain so that when the base plate is mounted in the cavity the chain is mounted in and along the chain-receiving slot.

The cut-out has first and second opposite ends lying along a cut-out axis parallel to the long axis of the chain. The cut-out axis is equi-distant between the sidewalls of the flanged channel. The first end of the cut-out is closed-off so that the adjacent portion of the lower web is continuous, extending between the sidewalls and between the first end of the cut-out and the adjacent first end of the lower web so as to form a resilient hinge in a plane containing the lower web. The opposite second end of the cut-out is open-ended. A flat bar-receiving slot is generally parallel to the side walls and extends from the second end of the cut-out to the adjacent second end of the lower web so as to receive a flat bar slid along into the cut-out. The flat bar receiving slot has a width, that is the spaced distance between the opposed facing edges of the slot, which is less than the thickness of the flat bar. Thus the flat bar-receiving slot must open resiliently, by deformation of the lower web about the slot and the resilient hinge, to receive the flat bar as it is slid into the cut-out. The flat bar-receiving closes resiliently behind the flat bar once the flat bar enter into the cut-out.

BRIEF DESCRIPTION OF THE DRAWINGS

FIG. 3 is a vertical sectional view through a chain run, orthogonally to the longitudinal axis of the chain of FIG. 1, showing the slider block and pusher lug of FIG. 1 within the confines of the chain run.

FIG. 4 is a vertical sectional view through a chain return showing the slider block and pusher lug of FIG. 1 sliding over the chain return.

FIG. 5 is the lower surface of the slider block of FIG. 1.

DETAILED DESCRIPTION OF EMBODIMENTS OF THE INVENTION

Figure 1:
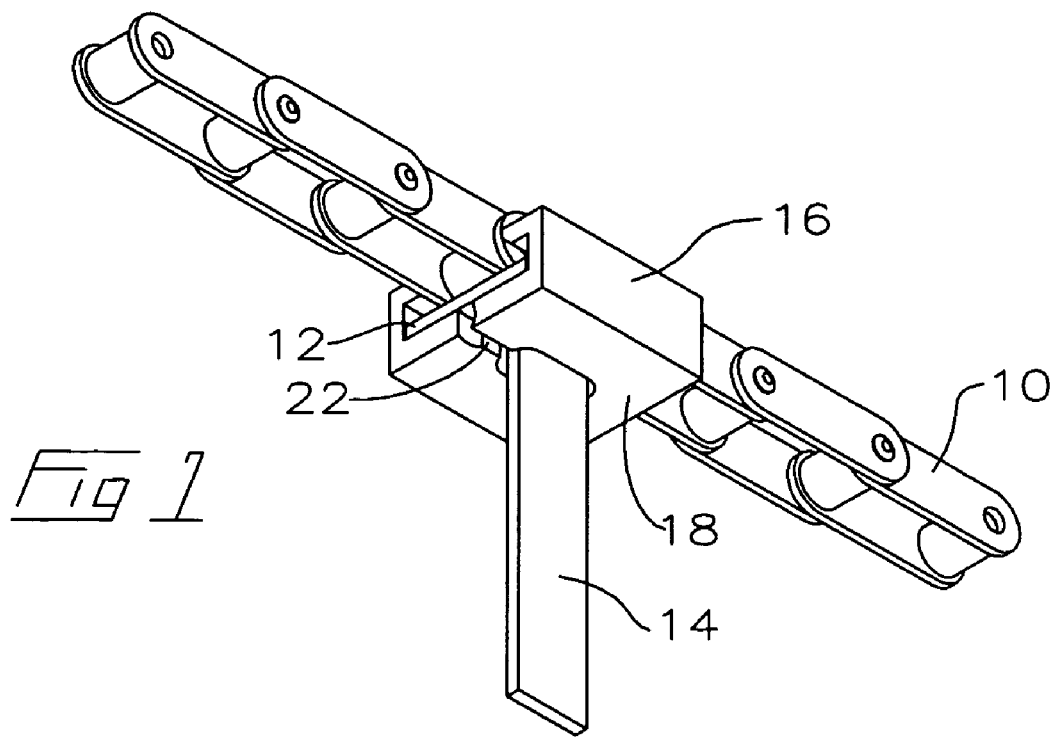
FIG. 1 is an isometric view of the slider block of the present invention mounted on a chain and pusher lug.
Figure 2:
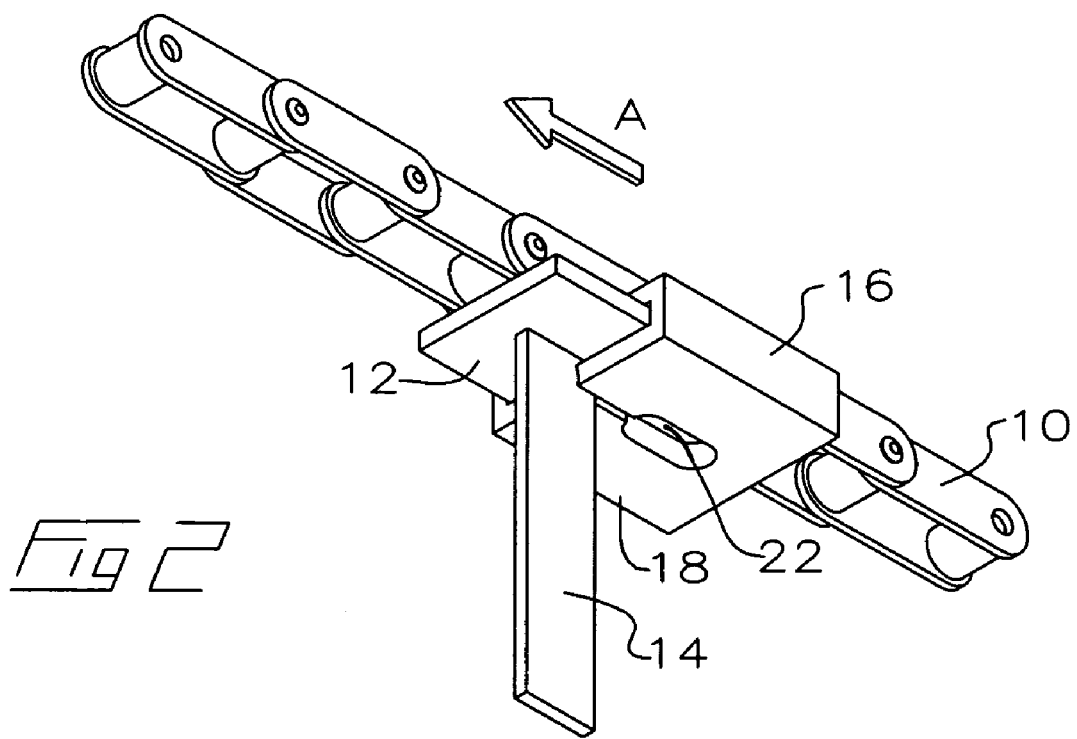
FIG. 2 is an isometric view of the slider block of to the present invention being slide on to the pusher lug of FIG. 1.
Figure 1A:
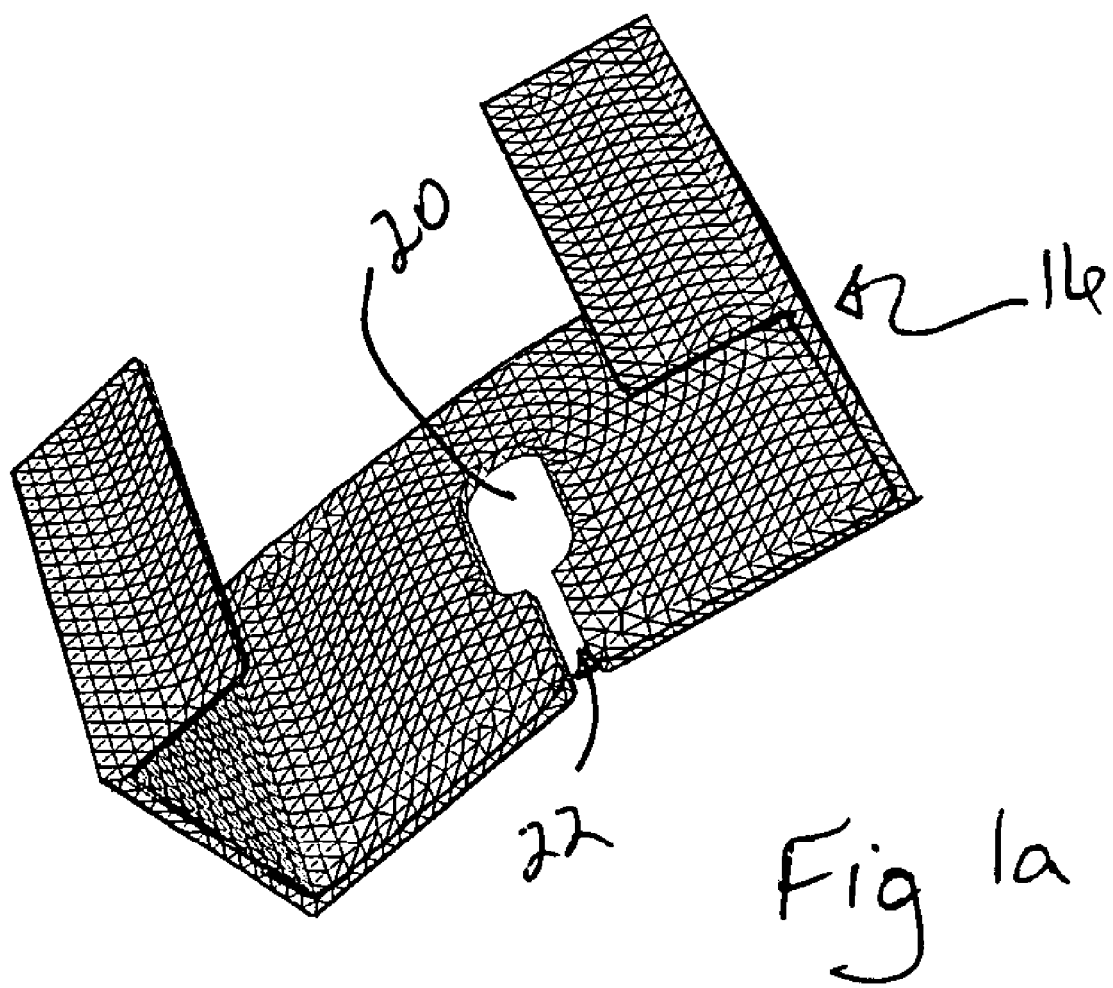
FIG. 1a is the slider block of FIG. 1 in top perspective view.

With reference to the drawing figures wherein similar characters of reference denote corresponding parts in each view, as seen in FIGS. 1 and 2, a length of chain 10 has plate 12 welded to it. A rigid flat bar 14 is welded to plate 12 so as to extend orthongally from the plate. The plate and flat bar form a pusher lug. A plurality of pusher lugs are mounted in spaced array along the length of the chain. Only one of the pusher lugs is illustrated. Bar 14 is welded to the plate so that it protrudes downwardly orthogonally from the plate to collectively forma T-shape in vertical cross-section. The plate is welded to the chain.

Slider block 16 is made of wear-resistant resilient material such as plastic or other malleable solids. In one embodiment, block 16 is a flanged channel sleeve or envelope (collectively referred to as a flanged channel) so that block 16 slides snugly and completely over plate 12, save and except for where plate 12 is welded to chain 10, as seen in the sectional views of FIGS. 3 and 4. As seen in FIG. 5, the lower surface 18 of slider block 16 has an elongate or obround aperture 20 machined or formed into it. A pusher lug receiving slot 22 connects aperture 20 to one edge of slider block 16. The width of slot 22 is smaller than the thickness of the flat bar 14. When slider block 16 is urged in direction A as shown in FIG. 2, such that slot 22 abuts the narrowest side of flat bar 14, slot 22 is resiliently deformed and opens or spreads apart to accommodate flat bar 14 and permit flat bar 14 to enter aperture 20. Once slider block 16 is in position such that flat bar 14 is contained within aperture 20, slot 22 resiliently returns to its un-deformed state and thus seals and retains slider block 16 on plate 12.

In operation, chain 10, plates 12 and slider blocks 16 run along the inner lowermost surfaces inside a chain run 24. Chain run 24 is suspended from above, as seen in FIG. 3. The lower surface of slider block 16 is contoured to match the contour of the inner lowermost surface of the chain run. Flat bar 14 protrudes downwardly from a slot in the lowermost surfaces of chain run 24. As chain 10 is run in a direction along its longitudinal axis opposite to direction A, slider block 16 slides along the inner surface of chain run 24, dragged along by flat bar 14, that is, chain 10 is run in a direction such that flat bar 14 pushes against the closed end of aperture 20 and not against slot 22. On an endless chain, at the end of the chain run, the pusher lug and slider block 16 are returned along chain return 26, as seen in FIG. 4. Chain return 26 is a channel in which chain 10 is run, slider block 16 carrying plate 12 and flat bar 14 over the upper surface of the channel.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An improved slider block for mounting on a chain mounted pusher lug, the slider block comprising:

a flanged channel having a lug receiving slot and a cut-out cooperating therewith in a lower web of said flanged channel to accommodate mounting a flat bar of the pusher lug journalled in said cut-out, wherein said flanged channel is resilient and covers the length of a base plate of the pusher lug on which the flat bar is orthogonally mounted, wherein opposite sides of said channel define a cavity having a depth corresponding to a thickness of the base plate, and wherein a pair of flanges extend inwardly in opposed facing relation over said cavity from said sides of said channel so as to define a chain-receiving slot therebetween, so that when the base plate is mounted within said cavity, the chain on which the base plate is mounted mates in and along the chain-receiving slot, and the flat bar mates in the cut-out.

2. The slider block of claim 1 wherein said cut-out has first and second opposite ends lying along a cut-out axis parallel to the long axis of the chain when the pusher lug is mounted in said slider block, said cut-out axis equi-distant between said sidewalls of said flanged channel, and wherein said first end of said cut-out is closed-off so that an adjacent portion of said lower web is continuous, extending between said sidewalls and between said first end of said cut-out and an adjacent first end of said lower web so as to form a resilient hinge in a plane containing said lower web, and wherein an opposite second end of said cut-out is open-ended by said pusher lug receiving slot.

3. The slider block of claim 2 wherein said pusher lug receiving slot is generally parallel to said side walls and extends from said second end of said cut-out to an adjacent second end of said lower web so as to receive the flat bar of the pusher lug slid along and into said cut-out.

4. The slider block of claim 3 wherein said pusher lug receiving slot has a width, being the spaced distance between an opposed facing pair of edges defying said pusher lug receiving slot, which is less than the thickness of the flat bar, wherein said pusher lug receiving slot opens resiliently, by deformation of said lower web about said pusher lug receiving slot and said resilient hinge, to receive the flat bar as it is slid into said cut-out, and said pusher lug receiving slot closes resiliently behind the flat bar once the flat bar is mounted within said cut-out.

* * * * *